Figure 1:
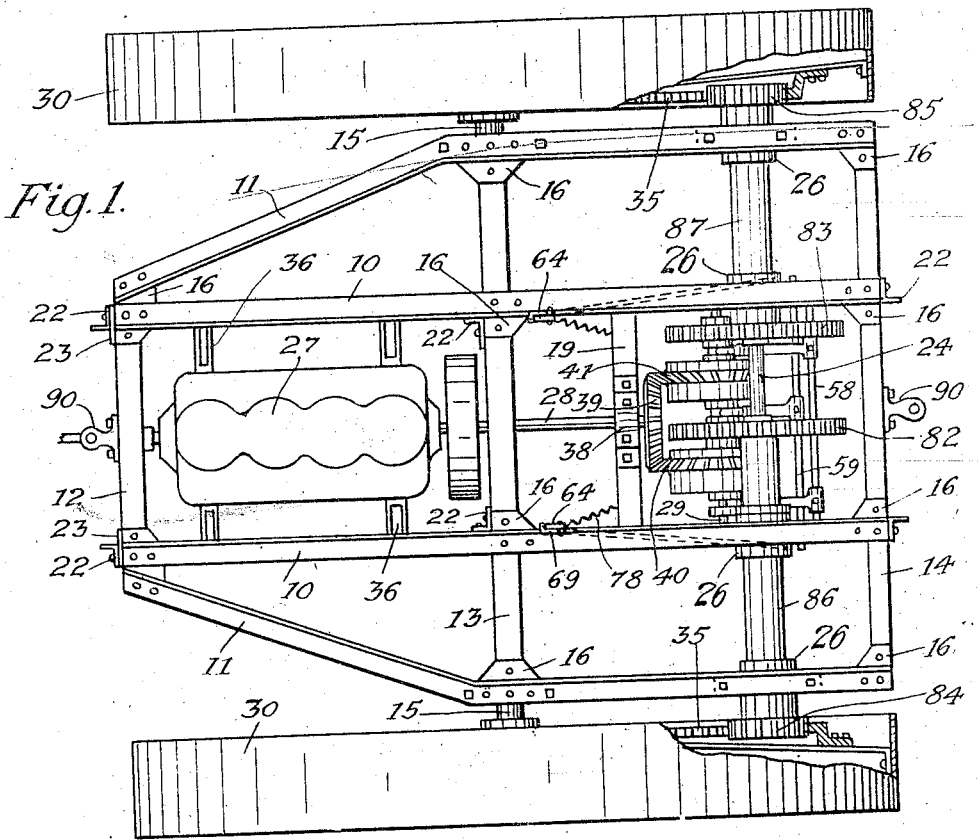

A. D. COLE.
TRACTION ENGINE.
APPLICATION FILED JULY 1, 1915.

1,240,423.

Patented Sept. 18, 1917.
3 SHEETS—SHEET 1.

Witnesses:

Inventor:
Arthur D. Cole.
By F. U. Whiteley
his Attorney.

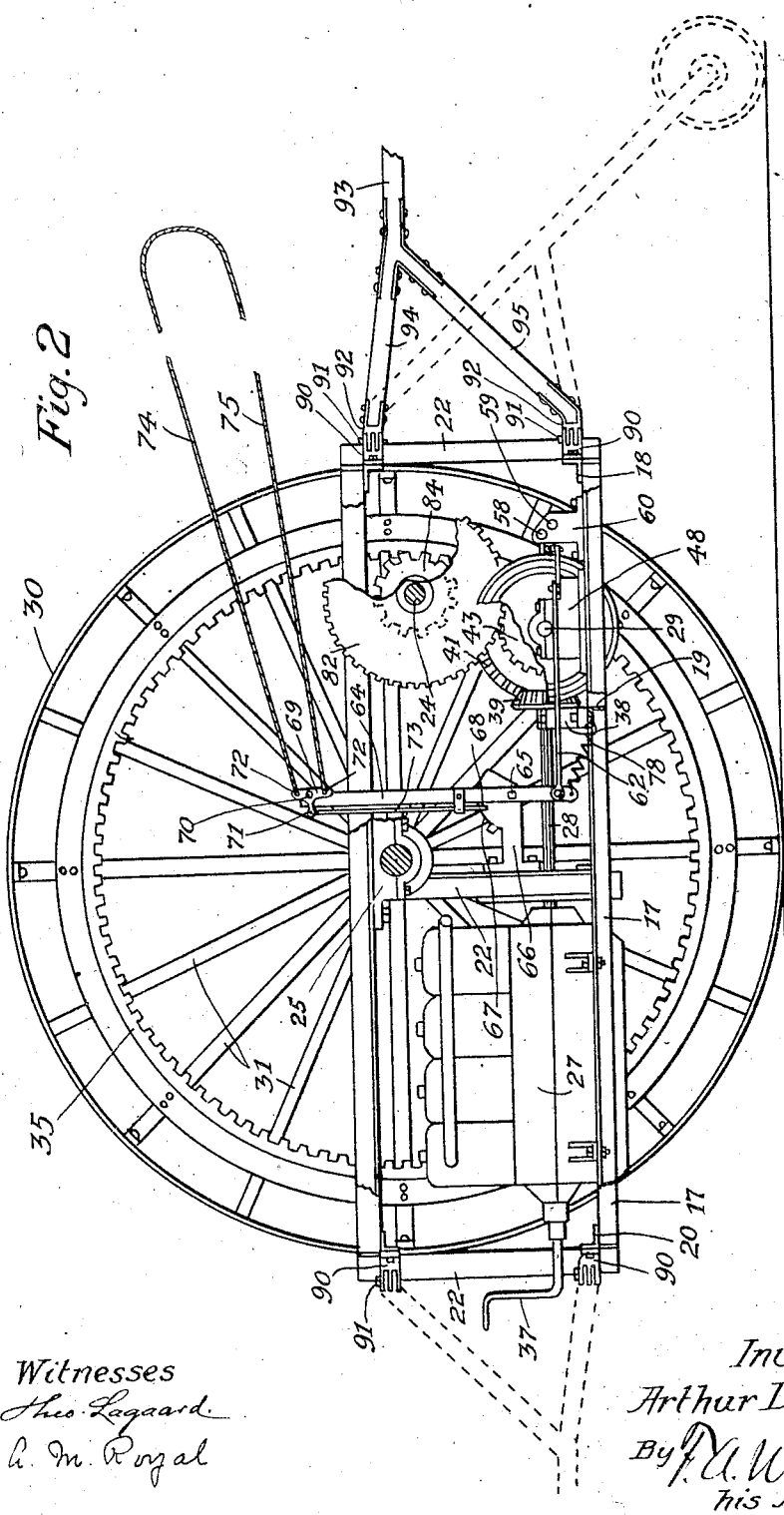

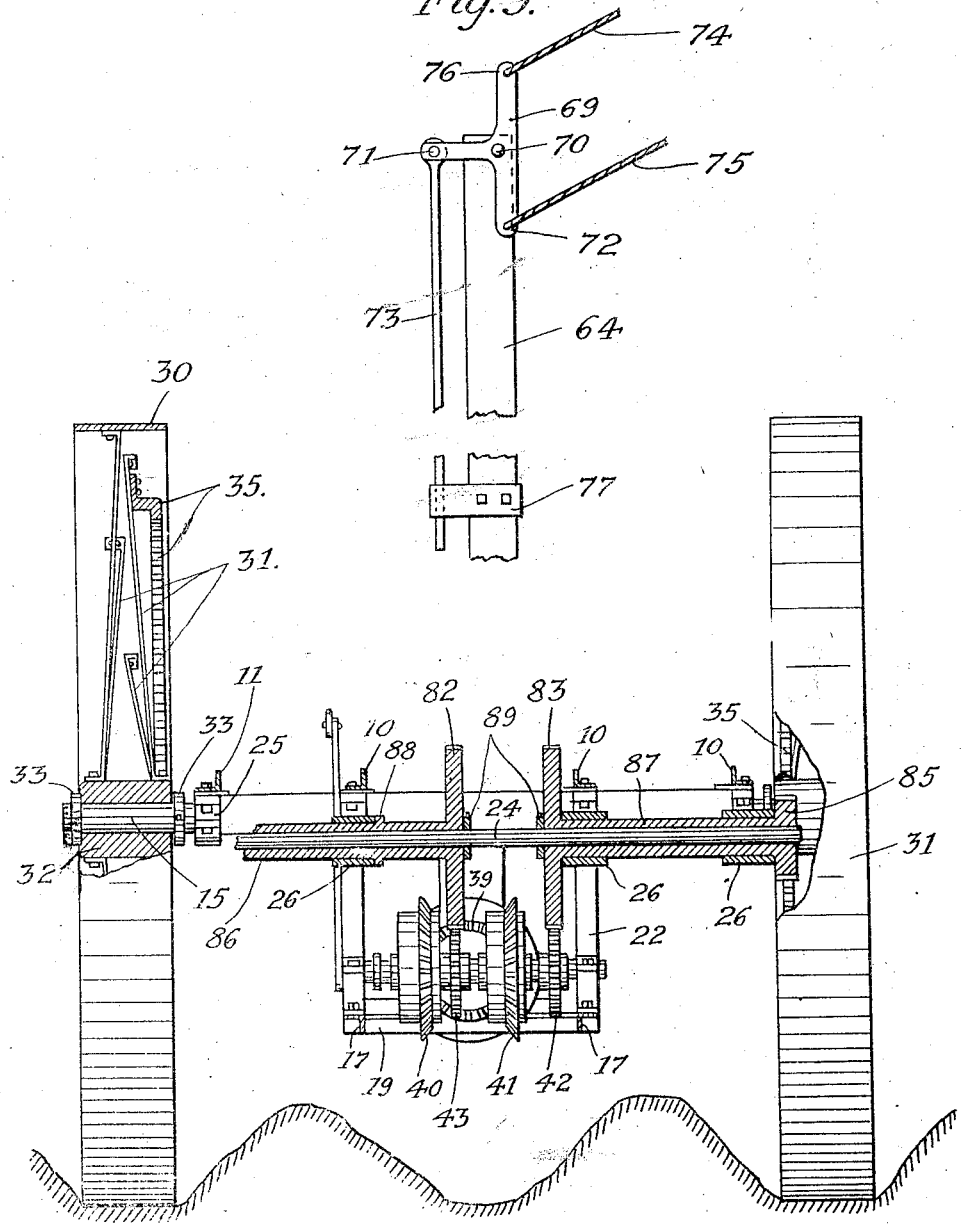

UNITED STATES PATENT OFFICE.

ARTHUR D. COLE, OF FORT PIERRE, SOUTH DAKOTA.

TRACTION-ENGINE.

1,240,423.　　　　　Specification of Letters Patent.　　Patented Sept. 18, 1917.

Application filed July 1, 1915. Serial No. 37,496.

*To all whom it may concern:*

Be it known that I, ARTHUR D. COLE, a citizen of the United States, residing at Fort Pierre, in the county of Stanley and State of South Dakota, have invented certain new and useful Improvements in Traction-Engines, of which the following is a specification.

My intention relates to traction engines and particularly to the frame work and the construction of driving and transmission elements related thereto.

It is the object of my invention to provide a traction engine having a pair of traction wheels and a frame supported upon the axle of said wheels in such manner that the engine and transmission elements shall be well suspended below the axle of said wheels, said frame being constructed in two planes and braced and cross-braced together so as to make an exceptionally strong and durable construction. It is also an object of my invention to provide a novel system of driving means and transmission in combination with clutch mechanism whereby either traction wheel can be driven in either direction at will while the engine is running at one speed ahead, the steering of the engine being entirely effected by the operation of the wheels.

In carrying out the latter construction I drive each of the wheels through a separate shaft each of which is adapted to be driven by a separate gear. These gears may severally be placed in driving connection through a clutch organization with one or the other of two driven gears operated in reverse direction from the crank shaft of the automobile. The clutches for the two drive gears are adapted to be independently actuated, so that it is possible to drive both traction wheels in the same direction either forward or backward, to drive either traction wheel by itself either forward or backward, or to drive one wheel forward while the other is being driven backward, thus enabling the engine to be turned very rapidly and efficiently.

The full objects and advantages of my invention will appear in connection with the detailed description thereof and are particularly pointed out in the claims.

In the drawings, illustrating the application of my invention in one form,—

Figure 4:
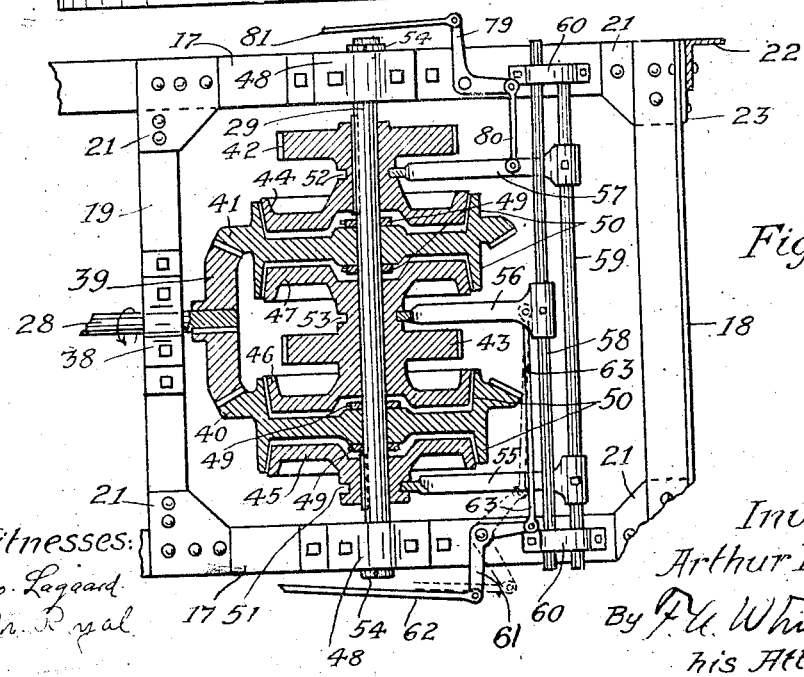

Figure 1 is a plan view of a traction engine embodying my improvements. Fig. 2 is a side elevation of the same. Fig. 3 is a part sectional elevation through the drive shaft for the wheels. Fig. 4 is a sectional plan view showing the transmission mechanism in detail. Fig. 5 is a detail of the clutch shifting mechanism.

The frame of my tractor is comprised entirely of angle steel fastened together with plates and rivets. The horizontal members of the frame are confined to two planes, one slightly above the wheel axle and one a considerable distance below. The upper horizontal part of the frame is comprised of the two straight longitudinal members 10 and the two bent longitudinal members 11, all having their flanges turned upward; also the transverse members 12, 13 and 14, members 12 and 14 having their flanges in, and member 13 coming above the wheel axle 15. These members are fastened together by means of the plates 16 which are riveted to them. The lower horizontal part of the frame is comprised of the two longitudinal members 17 and the transverse members 18, 19 and 20, members 17 and 19 having their flanges turned downward and members 18 and 20 having them turned upward, the whole being rigidly riveted together by means of the plates 21. The lower horizontal part of the frame is hung and rigidly secured to the upper horizontal part by the vertical members 22 and plates 23, making the frame light, rigid and economical of construction.

The wheel axle 15 and the countershaft 24 are journaled in bearings 25 and 26 supported from the members 10 and 11 of the upper horizontal part of the frame. The engine 27, the engine shaft 28 and the transmission shaft 29 are fastened and journaled to the lower horizontal part of the frame.

The drive wheels of the tractor, which wheels are two in number, are built up of steel and are made from the rolled rim 30, the bar spokes 31 and the cast hub 32. They are loosely journaled on the shaft 15 and prevented from having motion in the direction of the length of the shaft by the collars 33 rigidly fastened to the shaft by set screws. The shaft or axle 15 is loosely or securely mounted, as desired, in the bearings 25 attached to members 11 of the frame. The power received and transmitted by the wheels is taken through the internal gears 35, said gears being bolted to the spokes 31 of the wheels.

The engine 27 is located at the front of my tractor to counterbalance the transmission machinery which is located at the rear. The engine is bolted to the members 17 of the frame through the lugs 36, having the crank 37 projecting ahead of the frame proper to convenience cranking the engine. The engine shaft 28 has the additional bearing 38 attached to member 19 of the frame, said shaft terminating in the bevel gear 39 which is keyed thereto and is the driver for the transmission system now to be described.

The transmission system, as best shown in Fig. 4, consists of a plurality of gears 40, 41, 42 and 43 and clutches 44, 45, 46 and 47 mounted on the transmission shaft 29, said shaft being journaled in bearings 48 bolted to the members 17 of the frame. The bevel gears 40 and 41 are rotatably mounted on shaft 29 and are deprived of longitudinal motion on said shaft by collars 49 secured to said shaft by set screws. Gears 40 and 41 are always in mesh with engine drive gear 39 and run loosely and in opposite directions on shaft 29. Gears 40 and 41 are provided with conical inner flanges 50 which serve as one element of clutches 44, 45, 46 and 47. Clutch 45 is splined on shaft 29 and is supplied with the grooved collar 51. Clutch 44 is also splined to shaft 29 and also carries a grooved hub 52, which groove lies between clutch 44 and spur gear 42, of which gear clutch 44 is an integral part. Clutches 46 and 47, and gear 43, are all integral and carry the grooved hub 53 which lies between gear 43 and clutch 47. This one solid mass of parts is free to rotate or slide longitudinally on shaft 29. Shaft 29 itself is constrained to rotational movement only by collars 54 fastened thereto by set screws. Grooves 51, 52 and 53 have engaged therein shift arms 55, 56 and 57 and are fork-shaped to shift aforementioned gears and clutches in a longitudinal direction. Shift arms 55, 56 and 57 are rigidly fastened to shift rods 58 and 59 by means of set screws, which rods slide in holes in blocks 60, said blocks being bolted to members 17 of the frame. Rod 58 is situated somewhat higher than rod 59 in order to allow the arms 55 and 57, which are secured to rod 59, to pass under rod 58. Rod 58 and shift arm 56, which move as one, are actuated by the bell crank 61 and the links 62 and 63. Link 63 connects bell crank 61 with shift arm 56 and is pivoted at the points of connection. Link 62 connects bell crank 61 with catch lever 64 and is also pivoted at the points of connection, the joints being made loose enough to give the necessary play required on account of the mechanism not being confined to one plane.

Fig. 5 shows part of the catch lever 64 and my improved catch attached thereto. As is clearly shown in Fig. 2, the catch lever 64 is pivoted at 65 on the bracket 66, said bracket being bolted to the member 22 of the frame and provided with a segment 67 having a catch notch 68. Catch lever 64 carries at its upper extremity a T lever 69 pivotally mounted on lever 64 at 70 and pivotally attached to the catch rod 73 at 71, also having the ropes 74 and 75 attached at 72 and 76. Catch rod 73 which slides up and down in a slot in casting 77 bolted to lever 64 engages in the notch 68 of segment 67. Catch lever 64 projects beyond its point of pivot 65 to carry the link 62 and a tension coil spring 78, the other end of which is secured to the member 19 of the frame. The former mentioned shift rod 59 and lever arms 55 and 57, which move as one, are actuated by a bell crank 79 and links 80 and 81 which connect to a catch lever similar to lever 64 situated on the other side of the frame, as shown in Fig. 1.

Taking up the remaining portion of the transmission system, I will refer you to Figs. 1, 2, 3 and 4. The gears 43 and 42 previously referred to in Fig. 4 mesh with gears 82 and 83, best shown in Figs. 2 and 3. Gears 82 and 83 are cast in one piece with pinions 84 and 85 through the sleeves 86 and 87. Sleeves 86 and 87 rotating on shaft 24 are journaled in bearings 26 hung from members 10 and 11 of the frame. Sleeve 86 is deprived of longitudinal sliding by means of pinion 84 and collar 88. Sleeve 87 is deprived of longitudinal sliding by pinion 85 and gear 83, said gear pinions and collars running close up to the bearing 26. Shaft 24, which is only required for rigidity, is prevented from sliding by collars 89. Pinions 84 and 85 mesh with internal gears 35 through which the power is applied to the wheels and are the last gears in the transmission train.

The complete control of the tractor, which is effected through the right and left hand ropes 74 and 75, is extremely simple and is explained as follows. These ropes terminate in loops, as shown in Fig. 2, which are held in the operator's hands. Due to the simplicity of lengthening or shortening the length of the ropes the operator can sit on a seat on the rear of the tractor, not shown in any of the views, or the vehicle or machine drawn or pushed, or he can walk on the ground, as may best fit the circumstances. The operation so far as concerns the control of the tractor for forward or backward movement or for steering, generally stated, is as follows: The retracting devices consisting of the springs 78 which operate on the control levers and connected clutches or similar elements of the transmission system by which the wheels are independently driven at will, act to hold or shift said levers and associated devices into the forward position whereby both wheels will be turned in a direction to cause the tractor to move forward and the tractor will move forward in a straight line so long as said levers are permitted to remain in such forward position. In the central position of the levers to which they may be shifted by a pull upon the same and in which they may be locked, if desired, by the devices described, both wheels will be disconnected and the tractor will remain at rest or, as will be obvious, either lever may be shifted to the central position to cause the tractor to turn toward the side on which said lever is located owing to the fact that its appropriate wheel is disconnected from the power while the wheel on the opposite side is driven forward. A relaxation of the pull so as to allow the springs to shift the levers from central to forward position will cause the tractor to move forward. A strong pull upon the control levers against the action of the spring so as to shift them from the central position to the extreme backward position, will cause the wheels to be connected to the drive power in a manner to cause the tractor to move backwardly. During such backward movement the relaxation of pull upon either lever will allow it and its associated drive mechanism to be shifted to the central or neutral position by the action of the spring and steering may be effected therefore during rearward movement in the same way as during forward movement. A pull upon the right-hand lever shifting it from forward position to extreme backward position, (the lever upon the opposite side being at such time retained under the action of the spring in position for forward drive) will cause the tractor to turn upon itself in obvious manner and vice versa it may be caused to turn upon itself in the opposite direction by pulling the left-hand control lever to extreme backward position, the lever and associated devices upon the other side being at such time moved into or retained in the extreme forward position of the lever by the action of the spring when the pull on the latter lever is relaxed. To operate the levers 64 he twists his hands so as to pull the ropes 74 more than ropes 75, and so moves the T lever 69 and catch rods 73 so as to disengage the catches from the notches 68. Springs 78 immediately tend to draw levers 64 away from the operator, who by pulling ropes 74 and 75 can cause said levers to oscillate on bolt 65 as a fulcrum and leave said levers in their forward positions, or can hold them in their backward positions. After the levers have reached their forward positions the ropes can be left in a slack position. When the lever 64 is in its forward position bell crank 61 is in the dotted position shown in Fig. 4, and rod 58 and arm 56 are moved to the right so that clutch 47 engages with the clutch element of gear 41. If the engine shaft 28 has the direction of rotation shown by the arrow in Fig. 4, as is customary with most automobile engines, the left-hand wheel is caused to turn in a forward direction, which rotation can be traced through the gear train 39 to 41, 43 to 82, 84 to 35, as is well shown in Fig. 2. When the lever 64 is in the rear position the clutch 46, which is also integral with gear 43, engages with the clutch member of gear 40 and hence causes the left-hand wheel to revolve backward. In the central position of the lever 64 neither clutch is engaged and the wheel stands still in an identical manner. Clutches 45 and 46 and gear 42, through the splines in shaft 29, all rotate together and through the shift arms 55 and 57 are shifted together, thereby producing the forward and reverse rotation of the right-hand wheel in an identical manner with the left-hand wheel. It will be further noted that as clutches 44 and 45 are shifted together and likewise clutches 46 and 47, that there cannot be a locked condition of the mechanism and that further each wheel is independently controlled. In steering the operator manipulates the right-hand ropes 74 and 75 if he wishes to go to the right and shifts the lever 64 in the forward direction if he wishes to go forward. It is obvious that the controlling device is similar in operation and in terminal construction to that used in the guidance of horses, a feature well appreciated by men accustomed to such forms of power. It is also readily seen that the controlling device has all the flexibility of the reins used with horses or other draft animals.

My invention provides a novel and effective draft bar which is well shown in Fig. 2. Slotted castings 90 are bolted to the upper and lower members 12, 14, 18 and 20 of the frame in their centers and are also provided with holes through which the pins 91 can be inserted. Similar castings 92 which are also slotted to fit castings 90 and provided with holes to receive the pins 91, are fastened to the drawbar 93 by bolts or rivets. Drawbar 93 is made of three pieces, 93, 94 and 95, all fastened together by plates and rivets, as shown in Fig. 2. The draft is secured from the member 93 of the drawbar by ordinary means, not shown. Line of draft of drawbar 93 can be lowered by reversing the castings 90 and 92, as shown by the dotted lines to the left of Fig. 2. A similar drawbar with a trailer is shown in the dotted lines to the right of Fig. 2, which can be applied to the end of the tractor not carrying the regular drawbar 93.

I claim:

1. A traction engine comprising a pair of wheels, a frame including a transverse axle upon which said wheels are journaled, said frame comprising one set of members resting upon the axle and another set of members below the axle and rigidly secured thereto, an engine and transmission system mounted upon the lower portion of said frame so as to hang suspended from the axle, and a drawbar having a pivotal connection with both portions of said frame.

2. A traction engine comprising a pair of wheels, a frame including a transverse axle upon which said wheels are journaled, said frame comprising one set of members resting upon the axle and another set of members below the axle and rigidly secured thereto, an engine and transmission system mounted upon the lower portion of said frame so as to hang suspended from the axle, a drawbar having a pivotal connection with both portions of said frame, said transmission comprising means for driving either of the traction wheels independently in either direction, and means extending back of the drawbar for use of the operator to control said transmission to effect steering of the engine.

3. A traction engine comprising a pair of wheels, a frame including a transverse axle upon which said wheels are journaled, said frame comprising one set of members resting upon the axle and another set of members below the axle and rigidly secured thereto, an engine and transmission system mounted upon the lower portion of said frame so as to hang suspended from the axle, a draw bar having a pivotal conection with both portions of said frame, said transmission comprising means for driving either of the traction wheels independently in either direction, and a pair of lines extending back of the drawbar for use of the operator to control said transmission to effect steering of the engine.

4. A traction engine comprising a pair of wheels, a frame including a transverse axle upon which said wheels are journaled, said frame comprising one set of members resting upon the axle and another set of members below the axle and rigidly secured thereto, an engine and transmission system mounted upon the lower portion of said frame so as to hang suspended from the axle, a drawbar having a pivotal connection with both portions of said frame, and means for interchangeably connecting said drawbar to either end of the frame.

5. In combination with a traction engine having two traction wheels, means for differentially driving said wheels comprising an independent shaft for each wheel, a pair of oppositely-driven clutch members for each of said shafts, and means under control of the operator for effecting at will driving connection of either or both of said shafts with either of its or their corresponding clutch members.

6. In combination with a traction engine having two traction wheels, means for differentially driving said wheels comprising an independent shaft for each wheel, a pair of oppositely-driven clutch members, a slidable gear between said clutch members having driving connection with one of said shafts, controllable means connected with said gear for operatively connecting the same with either of said clutch members, a second sliding gear having operative connection with the other shaft, and controllable means for operatively connecting said second gear to either of said clutch members.

7. In combination with a traction engine having two traction wheels, means for differentially driving said wheels comprising an independent shaft for each wheel, a pair of double-faced clutch members provided with facing bevel gears, a bevel gear on the crank shaft of the engine meshing with both of said bevel gears for driving the clutch members in opposite directions, a gear provided with a pair of oppositely-turned clutch faces slidable so as to engage either of said gear clutch faces with either of the adjacent clutch faces of the clutch members, said gear having driving connection with one of said shafts, another gear operatively connected with a pair of clutch faces adapted to be alternately engaged with one or the other of the outer clutch faces of said clutch members, said last-named gear having driving connection with the other shaft, and means under the control of the operator for shifting either of said sliding sets of clutch members independently and at will for effecting driving connection of either or both of said shafts with either of said clutch members.

8. In combination with a traction engine having two traction wheels, means for differentially driving said wheels comprising an independent shaft for each wheel, a pair of double-faced oppositely-driven clutch members, a pair of corresponding clutch members for each shaft engageable with one of the faces of each of said oppositely-driven clutch members, and means under the control of the operator for causing said clutches to be engaged or disengaged to drive either of said traction wheels independently forward or backward or to permit them to independently travel free.

9. In combination with a traction engine having two traction wheels, means for differentially driving said wheels comprising an independent shaft for each wheel, a pair of oppositely-driven clutch members, a clutch system for and having operative connection with each shaft, and means under the control of the operator for independently actuating said clutch systems for effecting at will driving connection of either or both of said shafts with either or both of said clutch members, said means comprising rearwardly-extending flexible members for operating the clutches in one direction and springs tensioned by such operation for operating the clutches in the opposite direction.

10. In combination with a traction engine having two traction wheels, means for differentially driving said wheels comprising an independent shaft for each wheel, a pair of oppositely-driven clutch members, a clutch system for and having operative connection with each shaft, means under the control of the operator for independently actuating said clutch systems for effecting at will driving connection of either or both of said shafts with either or both of said clutch members, said means comprising rearwardly-extending flexible members for operating the clutches in one direction and springs tensioned by such operation for operating the clutches in the opposite direction, and means for locking the clutches where set.

11. In combination with a traction engine having two traction wheels, means for differentially driving said wheels comprising an independent shaft for each wheel, a pair of oppositely-driven clutch members, and means under the control of the operator for effecting at will driving connection of either or both of said shafts with either or both of said clutch members, said means including rearwardly-extending flexible lines.

12. In combination with a traction engine having two traction wheels, a frame including a transverse axle upon which said wheels are journaled, said frame comprising a frame member resting upon the axle and of a width substantially equal to the distance between the wheels, and another frame member below the axle of a width considerably less than the upper member and rigidly secured thereto, and an engine and transmission system mounted upon the lower portion of said frame so as to hang suspended from the axle and be confined to the width of the lower frame member.

13. In combination with a traction engine having two traction wheels, means for differentially driving said wheels comprising an independent shaft for each wheel, a pair of oppositely-driven clutch members, a gear between said clutch members having driving connection with one of said shafts, controllable means connected with said gear for operatively connecting the same with either of said clutch members, a second gear having operative connection with the other shaft, and controllable means for operatively connecting said second gear to either of said clutch members.

14. In combination with a traction engine having two traction wheels, means for differentially driving said wheels comprising an independent shaft for each wheel, a pair of double-faced clutch members provided with facing bevel gears, a bevel gear on the crank shaft of the engine meshing with both of said bevel gears for driving the clutch members in opposite directions, a gear provided with a pair of clutch faces one adapted to engage one of said forwardly-rotating clutch members and the other of said clutch faces adapted to engage one of said rearwardly-rotating clutch members, said gear having driving connection with one of said shafts, another gear operatively connected with a pair of clutch faces similarly adapted to be engaged with one or the other of the other clutch members, said last-named gear having driving connection with the other shaft, and means under the control of the operator for operating either of said sets of clutch members independently and at will for effecting driving connection of either or both of said shafts with either of said oppositely-driven gears.

15. In combination with a traction engine having two traction wheels, means for differentially driving said wheels comprising an independent shaft for each wheel, a transmission device for each shaft including a clutch for separately driving each wheel forward, independent reversing means for each wheel, and a single operating member for each wheel adapted when moved into one position to bring the clutch elements into driving relation to cause the corresponding tractor wheel to travel forward and adapted when moved into another position to disengage the clutch elements and to bring the reversing mechanism into action to cause said wheel to travel backward.

16. The combination with a traction engine having two independently driven traction wheels at opposite sides of the frame, a pair of oppositely driven clutch members for each of said wheels and means under the control of the operator for effecting at will driving connection of either or both of the wheels with either of its or their corresponding clutch members.

17. In a traction engine, the combination with traction and supporting wheels capable of being driven independently of one another and supporting the machine from opposite sides, of clutches one for each wheel whereby the same may be positively connected to the driving power independently of the other, clutch operating lines extending back of the drawbar of the engine to permit the operator, by pulling on said lines, to disconnect either clutch and springs operating on said clutches in the opposite direction to said pull to throw the clutches into engagement when the pull on the lines is relaxed and cause the engine to move forward and maintain its course.

18. A traction engine having a pair of independently mounted and driven traction wheels supporting the frame at opposite sides of the machine and having a motor driven shaft connected with said wheels through a transmission and clutches or clutch sets one for each wheel, said clutches or clutch sets being operable independently of one another and each adapted to reverse the drive of its tractor wheel or disconnect it from the motor at will and independently of the drive or disconnection of the other wheel.

19. Means for controlling and steering a traction engine provided with a pair of independently mounted tractor wheels supporting the machine at opposite sides of its frame, said means comprising clutches or clutch sets one for each tractor wheel, each clutch set being adapted to connect or disconnect its tractor wheel from the drive power and independently of the operation of the other clutch or clutch set and line connected with said clutch sets respectively through suitable operating devices to shift the clutches in one direction and retracting devices acting to shift the clutches in the opposite direction when the pull on the line or lines is slackened.

20. Means for controlling and steering a traction engine provided with a pair of independently mounted traction wheels supporting the machine from opposite sides, said means comprising clutches or clutch sets one for each wheel, each clutch or clutch set being adapted to reverse the drive of its wheel or disconnect it from the motor as desired and means operable by the driver for shifting the clutch set for either tractor wheel at will and independently of that for the other wheel into either of the three positions required respectively for forward drive, for backward drive or for disconnecting it from the driving power.

21. A traction engine having a pair of independently mounted and driven traction wheels supporting the machine from opposite sides and having means for controlling the forward and steering or turning movements of the engine comprising a clutch or clutch set one for each traction wheel adapted each to reverse the drive of its tractor wheel or disconnect it from the motor at will and independently of the other and an actuating or controlling device for each clutch operable in one direction by the driver and in the other operated by a retracting device acting on the same in the opposite direction to the pull whereby the driver, by pulling or slackening the pull on said actuating devices, may shift the clutch set for either wheel at will and independently of the other into any one of the three required positions for forward drive, for backward drive or for disconnecting the wheel from the driving power.

22. A traction engine having a pair of independently mounted and driven traction wheels supporting the frame of the machine from opposite sides, a single motor driven drive shaft, a transmission system having a set of transmission elements for each wheel through which the wheel may be driven in either direction or may be disconnected from the drive power and a single control lever for each set acting on said set in the three several positions of said lever respectively to produce forward or rearward drive of the wheel or to disconnect it, and a retracting device for each control lever acting thereon to hold or shift the same into the extreme position appropriate for forward drive so that by pulling or relaxing the pull upon either or both of said two control levers only, both traction wheels may be driven in the same direction either forward or backward or either may be driven by itself either forward or backward or may be driven in one direction while the wheel on the opposite side is being driven in the opposite direction.

23. Means for controlling and steering a traction engine provided with a pair of independently mounted tractor wheels supporting the machine at opposite sides of its frame, said means comprising clutches or clutch sets one for each tractor wheel, each clutch set being adapted to connect or disconnect its tractor wheel from the drive power or to reverse the drive and independently of the operation of the other clutch or clutch set, and lines connected with said clutch sets respectively through suitable operating devices for shifting said clutches by a pull upon the lines progressively from position for forward drive, through neutral or central position, to position for rearward drive, and retracting devices acting to shift the clutches in the opposite direction when the pull on the line or lines is slackened.

24. A traction engine having a pair of independently mounted and rotatable driving and supporting wheels at opposite sides of the machine and having its drive motor and system of transmission between the motor and tractor wheels mounted on a frame pendulously suspended from the axis of said wheels and arranged respectively at opposite sides of the axis and below the same so as to counterbalance one another and preserve said frame in stable equilibrium.

25. A traction engine having a pair of independently mounted and rotatable driving and supporting wheels for opposite sides of the machine, a frame freely suspended from the axis of said wheels and a driving engine and transmission machinery mounted in said frame below the axle and respectively to the front and rear of the axle to counterbalance one another.

26. In a traction engine, the combination with independently driven tractor wheels supporting the machine from opposite sides, of two independently operable control levers, means connected to each lever for operatively connecting said wheels with the drive motor to produce forward drive, to disconnect the drive, and to produce rearward drive in the three several positions respectively of said lever, a retracting device for each lever operating on the same to hold it in position for forward drive or to retract it from the shifted position of the lever for producing rearward drive back through central position, to said position for forward drive, whereby the operator, by merely pulling said levers against the action of the springs or by relaxing the pull, may cause the engine to move either forward or backward in a direct line or may steer the engine during either forward or backward movement or may cause it to turn upon itself in either direction.

In testimony whereof I affix my signature in presence of two witnesses.

ARTHUR D. COLE.

Witnesses:
F. J. GRAHAM,
LUCY BOWLES.